May 29, 1962  L. W. F. KAMPSCHMIDT  3,037,032
PURIFICATION OF PHTHALIC ANHYDRIDE, GLYCEROL AND PHENOL
Filed May 18, 1954 2 Sheets-Sheet 1
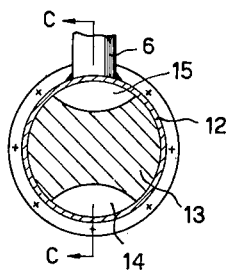
FIG. 5
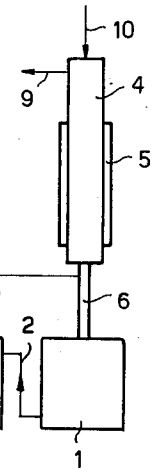
FIG. 1
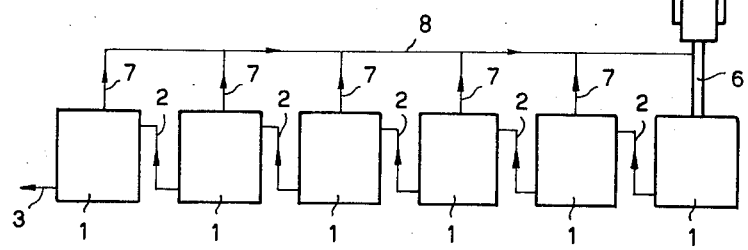
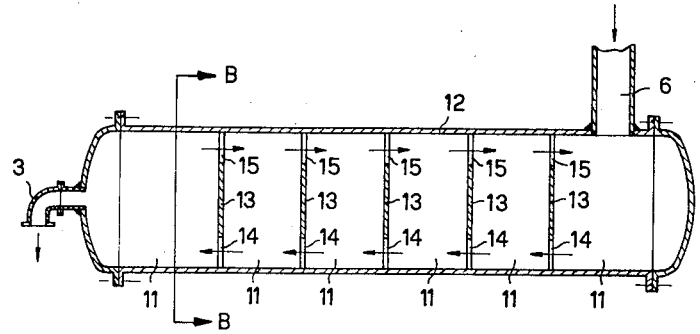
FIG. 4
INVENTOR:
Leonard W. F. Kampschmidt,
BY Cushman, Darby & Cushman
ATTORNEYS.

May 29, 1962 L. W. F. KAMPSCHMIDT 3,037,032
PURIFICATION OF PHTHALIC ANHYDRIDE, GLYCEROL AND PHENOL
Filed May 18, 1954 2 Sheets-Sheet 2
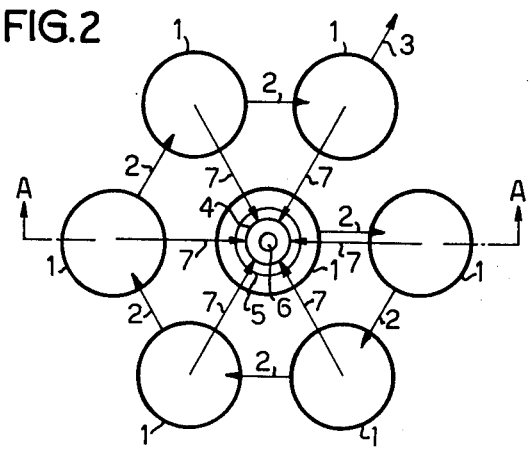
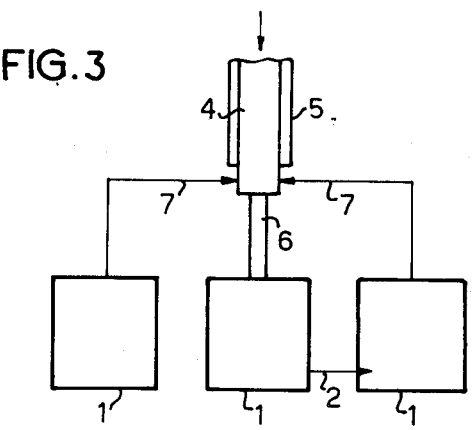
INVENTOR:
Leonard W. F. Kampschmidt,
BY Cushman, Darby & Cushman
ATTORNEYS.

United States Patent Office 3,037,032
Patented May 29, 1962

3,037,032
PURIFICATION OF PHTHALIC ANHYDRIDE, GLYCEROL AND PHENOL
Leonard W. F. Kampschmidt, Beek, Netherlands, assignor to Stamicarbon N.V., Heerlen, Netherlands
Filed May 18, 1954, Ser. No. 430,569
Claims priority, application Netherlands May 28, 1953
5 Claims. (Cl. 260—346.7)

The invention relates to apparatus for use in the continuous performance of reactions where it is necessary to condense vapor and the condensate is recycled.

It is a well-known procedure for reactions which take place at an elevated temperature, for example, in the presence of a volatile solvent, to be carried out in apparatus comprising a reaction chamber provided with a reflux condenser so that the vapors which are condensed return to the reaction chamber.

Such apparatus is also used for carrying out reactions in which vapor components react with each other and high molecular products are formed which flow back to the reaction chamber and do not vaporize but remain in the reaction chamber in the liquid state. Thus, for example, it is possible in such apparatus to free crude phthalic anhydride from the maleic anhydride and naphthoquinone present therein, as these materials have a lower boiling point than phthalic anhydride. In the above-described process a condensation reaction occurs in which maleic anhydride and naphthoquinone yield high molecular condensation products, which flow back into the reaction chamber and do not vaporize therefrom. The separation between the phthalic anhydride and the high molecular condensation products formed may then be subsequently effected by distillation.

Apparatus such as that referred to above comprising a reaction chamber and a reflux condenser has the disadvantage that reactions such as those mentioned cannot be carried on continuously in a satisfactory manner because the fresh initial material always becomes mixed with the reaction products, so as to make it impossible for a subsequent and continuous distillation to take place.

Accordingly, it is an object of the present invention to provide an apparatus which is suitable for continuously carrying out reactions where a vapor must be condensed.

It is a more specific object to provide such an apparatus wherein a number of reaction vessels are connected in series so that material can be fed continuously into the first vessel and continuously discharged from the last vessel in a liquid state.

Another object of the present invention is to devise a method of carrying out in a continuous manner a reaction wherein vapor is formed and condensed.

It is a more specific object to devise such a method which, at the same time, makes it possible to perform a subsequent continuous distillation.

It is another object to purify glycerol by an improved continuous process.

It is another object to purify phthalic anhydride by an improved continuous process.

Another object is to purify phenol by an improved continuous process.

Another object is to purify caprolactam by an improved continuous process.

The present invention accomplishes these objects by providing apparatus for continuously performing reactions where vapor is condensed and the condensate returned to the reaction vessel, said apparatus comprising a number of reaction chambers connected in series so that material can be fed continuously into the first chamber of the series and continuously discharged from the last chamber of the series after passing through all the chambers in succession, each said chamber having a discharge passage for vapor leading to a reflux condenser common to all the chambers, and the said reflux condenser having its return passage for liquid connected to at least one of the first two chambers of the series.

The invention will now be explained in more detail with reference to the embodiments illustrated by way of example in the accompanying diagrammatic drawings, in which:

FIGURE 1 shows one form of the apparatus comprising six reaction chambers connected in a straight series by conduits;

FIGURE 2 is a top view of another form of the apparatus;

FIGURE 3 is a vertical section on the line AA in FIGURE 2;

FIGURE 4 is a vertical section on the line CC in FIGURE 5 in a third form of the apparatus; and FIGURE 5 is an end section on the line BB in FIGURE 4.

Referring more specifically to the drawings, the apparatus shown in FIGURE 1 comprises six reaction chambers 1 connected in series by conduits 2. The last reaction chamber (going from right to left) in this series of chambers 1 is equipped with a discharge pipe 3 for discharging reaction liquid. A reflux condenser 4, provided with a heating or cooling jacket 5, is connected with the first reaction chamber of the series of chambers 1 by way of its liquid return pipe 6. In some cases, the jacket 5 can be omitted entirely.

From the reaction chambers, which are provided with suitable heating devices (not shown in the drawing), vapor escapes through the vapor pipes 7 and flows to the reflux cooler 6 along the pipe 8. The condenser 4 is provided at its upper end with an outlet 9 through which non-condensed vapors are carried off.

The initial material is supplied through the feed pipe 10 provided at the top of the condenser 4, so that the initial material flows into the first reaction chamber of the series through the condenser 4 and the pipe 6. Alternatively, the feed pipe for the initial material may be directly connected to the first reaction chamber without going through the condenser.

The apparatus illustrated in FIGURES 2 and 3 comprises seven reaction chambers of which six are arranged in a ring and one in the center. The reaction chambers are linked by connecting pipes 2 so that reaction liquid flows through the chambers 1 in the direction indicated by the arrows. Th initial feed of material is to the central chamber through the reflux condenser, as in FIGURE 1. The vapor pipe 7 from each reaction chamber is connected directly to the condenser 4. A main vapor pipe, such as pipe 8 in FIGURE 1, is unnecessary in the apparatus of the form of invention illustrated in FIGURES 2 and 3.

In the embodiment of apparatus shown in FIGURES 4 and 5, the series of reaction chambers is formed by the compartments 11 of a horizontal cylindrical vessel 12. Over the first of the series of compartments 11 is placed a reflux condenser (not shown in the figure), the return pipe 6 of which leads into the said first compartment.

The compartments 11 are separated by partitions 13. The reaction liquid flows through the lower openings 14 in such partitions and thus passes through all of the compartments 11 in succession, and thereafter it is carried off through the conduit 3. Openings 15 are provided in the upper parts of the partitions 13 to enable the vapors to flow to the conduit 6 and thus into the reflux condenser. When operating with this apparatus a continuous liquid flow is kept up through the lower part of the vessel 12, while simultaneously with and countercurrently to said liquid flow a continuous vapor flow is maintained through the upper part of said vessel 12. In this form of the invention sufficient liquid should be maintained in vessel 12 to reach the lower part of partitions 13 but preferably not enough liquid should be present to reach the top of partitions 13.

Apparatus according to the invention is especially suited for performing reactions between components which are present in relatively small amounts in a reaction liquid with a higher boiling point, and where the reacting components are present as contaminants in products which are to be purified. For example, in purifying glycerol, it is necessary to remove impurities which are difficult to eliminate by distillation and which at higher temperatures lead to the formation of a colored product. In apparatus according to the invention the color-forming impurities are converted into a resinous product by boiling the impure glycerol in the reaction chambers. Glycerol is obtained in a reaction wherein the product also contains a resinous material. This resinous material can be separated from the glycerol by distillation and is left behind as distillation residue. The glycerol purified in this manner is a suitable starting material for preparing colorless artificial resins, for example, by condensation with phthalic anhydride.

Another example of the application of the invention is in the purification of phthalic anhydride in which the impurities, chiefly consisting of maleic anhydride and naphthoquinone, are converted into a high molecular condensation product which in a simple manner, namely, by distillation, can be subsequently separated from the phthalic anhydride.

Furthermore, the apparatus can be used to purify substances that normally are distilled but prior to distillation must be subjected to a pretreatment in which they are heated after addition of a chemical compound for converting the impurities which would distill over during the distillation, into compounds which during the distillation are easy to remove, e.g., do not distill. An example of such a use is with epsilon caprolactam which, as is well known, must be heated before or during the distillation in the presence of chemical additives, such as sodium hydroxide, sulfuric acid or potassium permanganate. The apparatus described is especially suited for carrying out a pretreatment of this type. In the subsequent distillation the impurities remain behind as residue, together with the substances added.

The apparatus of the present invention is also used for removing sulfur compounds from organic products, such as phenol, which are to be freed from the volatile thiophenol present therein. This oxidation, which can be carried out with air or other oxidation agents, can be effected in the apparatus described. In the above-specified treatment, the thiophenol is converted into the nonvolatile diphenyldisulfide which, in the distillation, remains behind as residue.

Several specific applications of apparatus according to the invention are described in the following examples which are illustrative only but not of a limiting nature.

*Example I*

Impure glycerol made by hydrolysis of natural fats was purified in apparatus of the type shown in FIGURES 2 and 3. The apparatus employed included seven reaction chambers, each with a capacity of 150 liters. The glycerol was fed continuously into the first of the series of reaction chambers at the rate of 0.1 liter per liter of reaction space per hour. The temperature in the reaction chambers was kept at about 300° C., the temperature at the top of the reflux condenser being 250° C.

The residence time of the glycerol in the apparatus was about 12 hours. The continuously discharged glycerol, which had a dark-brown color, was supplied to the distillation plant where it was continuously removed by distillation. A dark-colored residue remained behind. The distilled glycerol was colorless and did not discolor when the glycerol was heated at 250° C. for several hours.

*Example II*

Phthalic anhydride containing maleic anhydride and naphthoquinone as impurities was purified in an apparatus of the type shown in FIGURES 4 and 5. The apparatus employed included six reaction chambers separated by partitions. Each chamber had a capacity of 150 liters. Molten phthalic anhydride was continuously supplied to the first of the series of reaction chambers through the reflux condenser at the rate of 0.2 liter per liter of reaction space per hour. The reaction product was discharged from the last reaction chamber at the same rate.

The operation of the apparatus was tested using pure phthalic anhydride to which 1 part by weight of naphthoquinone and 2 parts by weight of maleic anhydride had been added per 100 parts by weight of phthalic anhydride. The temperature in the reaction chambers was kept at 284° C., the temperature in the upper part of the reflux condenser being 155° C. The residence time of the reaction liquid in the apparatus was about 6 hours. The liquid discharged from the last reaction chamber was continuously supplied to a distilling plant where the phthalic anhydride was continuously distilled. In that process pure white phthalic anhydride (solidifying point 131.3° C.) was obtained which did not contain naphthoquinone and had a maleic anhydride content of less than 0.01%.

The same results were obtained when phthalic anhydride to which 3 parts by weight of naphthoquinone and 6 parts by weight of maleic anhydride had been added per 100 parts by weight of phthalic anhydride was used.

*Example III*

Phenol containing 0.3% of sulfur (in the form of sulfur compounds, such as thiophenol) was purified in the same apparatus as used in Example II. The molten phenol was fed into the first reaction chamber to which air was also supplied. The feed rate and the residence time in the apparatus were about the same as in Example II. The temperature in the reaction chambers was kept at 182° to 185° C. and in the upper part of the reflux condenser at 80° to 90° C. The liquid reaction product was supplied continuously to a distilling plant and the phenol recovered by distillation. The resultant purified phenol contained less than 0.003% of sulfur.

While in the specific examples and in the drawings the reflux condenser has its return passage attached to the first reaction chamber, and this is the preferred form of the invention, it is within the scope of the present invention to have the return passage of the reflux condenser attached to the second reaction chamber or to have a reflux condenser with a split return passage, one part being attached to each of the first and second reaction chambers in the series. In no event should the reflux condenser return passage be attached to the last reaction chamber. While it is possible to use as little as two reaction chambers providing that no reflux condenser return passage is attached to the second reaction chamber, preferably, six or seven reaction chambers are employed in series. While there is no maximum number of reaction vessels which can be employed, normally, there is not a sufficient improvement in results to justify the expense of using over seven reaction chambers in series.

While the specific examples are drawn to the purification of organic compounds, the apparatus of the present invention, as well as the process, can be used with equal success in purifying inorganic substances, e.g., liquid ammonia.

It will be appreciated that various modifications can be made in the invention as described above, without in any way deviating from the scope thereof, as defined in the appended claims.

I claim:
1. A method of purifying phthalic anhydride compris- ing continuously supplying crude phthalic anhydride containing maleic anhydride and naphthoquinone to a chamber, other than the last chamber, of a plurality of reaction chambers connected in series, continuously passing said crude phthalic anhydride in liquid form through the series of chambers from the first to the last, maintaining the temperature in the reaction chambers at reflux and carying out the reaction under reflux distillation in all the chambers of the series simultaneously and permitting the condensate to return only to a reaction chamber other than the last chamber, the temperature in the reflux condenser being maintained sufficiently high to cause the maleic anhydride and naphthoquinone to react in the vapor phase and yield high molecular weight condensation products which flow back into the reaction liquid, continuously discharging the liquid product from the last chamber of the series and then separating the phthalic anhydride from the high molecular weight condensation products after discharging the mixture from the last chamber.

2. The process of claim 1 wherein the temperature in reaction chambers is kept at about 284° C. and from 1 to 3 parts naphthoquinone and 2 to 6 parts of maleic anhydride are present for each 100 parts by weight of phthalic anhydride in the starting material and the final separation is accomplished by distilling the phthalic anhydride.

3. A method for purifying crude glycerol prepared by the hydrolysis of fat comprising continuously supplying the crude glycerol to be reacted to a chamber, other than the last chamber, of a plurality of reaction chambers connected in series, continuously passing liquid through the series of chambers from the first to the last, carrying out the reaction under reflux distillation in all the chambers of the series simultaneously and permitting the condensate to return only to a reaction chamber other than the last chamber and continuously discharging the liquid glycerol product from the last chamber of the series and thereafter separating the glycerol from the color bodies formed therein by distilling the glycerol after discharging the mixture from the last chamber.

4. A method for purifying crude phenol containing sulfur compounds comprising continuously supplying the crude phenol to a chamber, other than the last chamber, of a plurality of reaction chambers in series, supplying air to the first chamber of the series, continuously passing the phenol through the series of chambers from the first to the last, maintaining the temperature in the chambers at reflux, carrying out the reaction under reflux distillation in all the chambers of the series simultaneously and permitting the condensate to return only to a reaction chamber other than the last chamber and continuously discharging liquid phenol containing sulfur compounds of increased molecular weight from the last chamber of the series and thereafter separating the phenol from the impurities.

5. The process of claim 4 wherein the final separation is accomplished by distilling the phenol.

References Cited in the file of this patent

UNITED STATES PATENTS

| | | |
|---|---|---|
| 478,132 | Rowland | July 5, 1892 |
| 589,000 | Krebs | Aug. 31, 1897 |
| 1,336,182 | Andrews | Apr. 6, 1920 |
| 1,741,305 | Jaeger | Dec. 31, 1929 |
| 1,766,863 | Wecker | June 24, 1930 |
| 1,898,414 | Wilson | Feb. 21, 1933 |
| 1,953,937 | Jaeger | Apr. 10, 1934 |
| 1,993,886 | Jaeger et al. | Mar. 12, 1935 |
| 2,083,856 | Moravec et al. | June 15, 1937 |
| 2,108,990 | Morlock | Feb. 22, 1938 |
| 2,160,177 | Shuman | May 30, 1939 |
| 2,640,804 | Whitney | June 2, 1953 |
| 2,704,742 | Petrich | Mar. 22, 1955 |